United States Patent
Yu et al.

(10) Patent No.: US 11,290,303 B2
(45) Date of Patent: *Mar. 29, 2022

(54) SYSTEM AND METHOD FOR VNF TERMINATION MANAGEMENT

(71) Applicant: Futurewei Technologies, Inc., Plano, TX (US)

(72) Inventors: Fang Yu, Beijing (CN); Zhixian Xiang, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/929,435

(22) Filed: Jul. 15, 2020

(65) Prior Publication Data

US 2020/0351120 A1 Nov. 5, 2020

Related U.S. Application Data (63) Continuation of application No. 15/344,282, filed on Nov. 4, 2016, now Pat. No. 10,728,054.

(60) Provisional application No. 62/250,908, filed on Nov. 4, 2015.

(51) Int. Cl.
*H04L 12/46* (2006.01)
*H04L 67/10* (2022.01)
*H04L 67/143* (2022.01)

(52) U.S. Cl.
CPC .......... *H04L 12/4641* (2013.01); *H04L 67/10* (2013.01); *H04L 67/143* (2013.01)

(58) Field of Classification Search
CPC .... H04L 12/4641; H04L 67/10; H04L 67/143
See application file for complete search history.

(56) References Cited

U.S. PATENT DOCUMENTS

| | | |
|---|---|---|
| 9,553,757 B1 | 1/2017 | Roth |
| 2016/0170848 A1 | 6/2016 | Yang et al. |
| 2016/0381150 A1 | 12/2016 | Rajagopal et al. |
| 2017/0006083 A1* | 1/2017 | McDonnell ......... H04L 67/1097 |
| 2017/0171015 A1 | 6/2017 | Lin |
| 2017/0257276 A1* | 9/2017 | Chou .................. H04L 41/0823 |
| 2018/0013586 A1 | 1/2018 | Wang |
| 2018/0026855 A1 | 1/2018 | Ji et al. |
| 2018/0253332 A1* | 9/2018 | Andrianov ............ H04L 41/064 |
| 2018/0316730 A1 | 11/2018 | Schaefer et al. |
| 2019/0073269 A1* | 3/2019 | Chou .................. G06F 11/1438 |

(Continued)

OTHER PUBLICATIONS

GS NFV IFA011 v030 (Oct. 2015) Network Functions Virtualization (NFV); Management and Orchestration; VNF Packaging Specification; (Year: Oct. 2015) (Year: 2015).*

(Continued)

*Primary Examiner* — Michael A Keller
*Assistant Examiner* — Jsing Forng Lin
(74) *Attorney, Agent, or Firm* — Slater Matsil, LLP (57) ABSTRACT

An apparatus and method for terminating a virtual network function (VNF) instance according to termination requirements of the VNF instance. The termination requirements may be defined in a VNF descriptor corresponding to the VNF instance. A network function virtualization (NFV) management entity may obtain the termination requirements and initiate termination of the VNF instance based on the obtained termination requirements.

25 Claims, 5 Drawing Sheets

(56) References Cited

U.S. PATENT DOCUMENTS

2019/0141509 A1* 5/2019 Copeland ............ H04L 67/1097

OTHER PUBLICATIONS

ETSI, "Network Functions Virtualisation (NFV); Management and Orchestration; VNF Packaging Specification," ETSI Specification, GS NFV IFA011 V0.6, May 2016, pp. 1-60.

Network Functions Virtualization (NFV); Management and Orchestration; VNF Packaging Specification, GS NFV IFA011, Oct. 2015, V0.3.0.

* cited by examiner

SYSTEM AND METHOD FOR VNF TERMINATION MANAGEMENT

CROSS-REFERENCE TO RELATED APPLICATIONS

This application is a continuation of U.S. patent application Ser. No. 15/344,282, filed on Nov. 4, 2016 and entitled "System and Method for VNF Termination Management," which claims priority to U.S. Provisional Application No. 62/250,908, filed on Nov. 4, 2015 and entitled "System and Method for VNF Termination Management," which is hereby incorporated by reference herein as if reproduced in its entirety.

TECHNICAL FIELD

The present invention relates to a system and method for network function virtualization, and, in particular embodiments, to a system and method for VNF termination management.

BACKGROUND

Network function virtualization (NFV) uses virtualization technologies to consolidate network equipment into industry standard hardware, with goals of achieving cost reduction, and efficient/agile network operation and performance. Generally, NFV separates network functions from the hardware they run on by use of virtual hardware abstraction, and seeks to virtualize entire classes of network node functions into building blocks that may be connected or chained together to create communication services.

In NFV, virtualized network functions (VNFs) are initiated to handle specific network functions that run on one or more virtual machines (VMs) on top of a hardware networking infrastructure. Individual virtual network functions may be connected or combined together as building blocks to offer a full-scale network service. Development of apparatuses and methods for implementing and managing virtualized network functions (VNFs) is critical and desirable.

SUMMARY

Technical advantages are generally achieved, by embodiments of this disclosure which describe a system and method for VNF termination management.

In accordance with an embodiment, a method is provided for virtual network function (VNF) management. The method includes obtaining, by a processing system, a termination requirement for terminating a VNF instance. The termination requirement of the VNF instance may be defined in a VNF descriptor (VNFD) corresponding to the VNF instance. The method further includes initiating, by the processing system, termination of the VNF instance in accordance with the termination requirement of the VNF instance, and receiving, by the processing system, a termination result of the VNF instance indicating whether the VNF instance is terminated.

In accordance with another embodiment, an apparatus includes a non-transitory memory storage including instructions, and one or more processors in communication with the memory. The one or more processors execute the instructions to obtain a termination requirement for terminating a VNF instance. The termination requirement of the VNF instance may be defined in a VNF descriptor (VNFD) corresponding to the VNF instance. The one or more processors also execute the instructions to initiate termination of the VNF instance in accordance with the termination requirement of the VNF instance, and receive a termination result of the VNF instance indicating whether the VNF instance is terminated.

In accordance with yet another embodiment, a method is provided for VNF termination management. The method includes determining, by a network function virtualization (NFV) management entity, a termination type of a VNF instance and a termination policy and an associated termination procedure for the VNF instance in accordance with a description of a VNF termination characteristic defined in a VNFD associated with the VNF instance. The method also includes sending, by the NFV management entity, a request to terminate the VNF instance, and receiving a termination result of the VNF instance. The method further includes conducting, by the NFV management entity, a further operation defined in the VNFD for termination of the VNF instance.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In network function virtualization (NFV), different virtual network functions (VNFs) from different vendors may have different functionalities and may be based on different interior designs. Thus, different VNFs may have different requirements for terminating their corresponding VNF instances. However, these differences are not considered in conventional VNF termination mechanisms.

Embodiments of the present disclosure provide a method for VNF management, where a VNF instance is terminated according to one or more of its termination requirements. The one or more termination requirements of the VNF instance may be included in a VNF descriptor (VNFD) corresponding to the VNF instance. Different VNF termination requirements may be defined and/or updated by different service providers. The method may be performed by any NFV management entity, such as a VNF manager (VNFM), a NFV orchestrator (NFVO), or an element manager (EM). A NFV management entity may obtain the termination requirements of the VNF instance and initiate termination of the VNF instance in accordance with the obtained termination requirements. Embodiments of the present disclosure improve end-to-end system performance and may be helpful to protect VNF providers' interests. The embodiments may be utilized in any NFV implementations.

In network function virtualization (NFV), a virtual network function manager (VNFM) may be used to manage a life cycle of a virtual network function (VNF) instance. A VNF instance may be initiated by a network function virtualization orchestrator (NFVO), an element manager (EM), another VNF, or the VNFM itself. Management of a life cycle of a VNF instance may include instantiation, scaling, updating/upgrading and termination of the VNF instance.

Different VNFs from different vendors may have different functionalities and may be based on different interior designs. As a result, different VNFs may support different termination mechanisms. For example, some VNFs may only support a graceful termination mechanism. According to the graceful termination mechanism, a VNF instance may be first arranged to be taken out of a service, and when the VNF instance is taken out of the service successfully or when a pre-set timer expires, the VNF instance is shut down and resources assigned to the VNF instance are released. That is, a grace period will be allowed for gracefully terminating the VNF instance. As another example, a VNF may only support a forceful termination mechanism, where a VNF instance is shut down immediately when it is to be terminated, and resources allocated to the VNF instance are released. In other examples, a VNF may support both the graceful termination mechanism and the forceful termination mechanism. In this case, one of the termination mechanisms may be selected to terminate a VNF instance based on other information, such as the type of a network service associated with the VNF instance, or the reason to terminate the VNF instance. For example, in case of a power outage, the VNF instance may be forcefully terminated, and in case of a scheduled maintenance, the VNF instance may be gracefully terminated.

Even when different VNFs support the same termination mechanism, they may still be terminated differently. For example, in some cases, terminating a VNF instance may involve terminating a set of virtual machines (VMs) associated with the VNF instance. Different VNF instances may involve different sets of VMs, and these VMs may need to be terminated in different orders, such as in parallel or sequentially. Thus, terminating gracefully the different sets of the VM may require different grace periods. In such a case, even when different VNFs all support the graceful termination, waiting periods for corresponding VNF instances to execute their termination procedures that gracefully shut down the corresponding VNF instances will be different.

However, the current VNF termination mechanism proposed in ETSI NFV is OpenNFV (ONFV) driven, and different requirements of VNFs for termination are not considered. Termination of VNF instances impacts VNF performance, and it would be appreciated if VNF instances may be terminated according their specific termination requirements.

Figure 1:
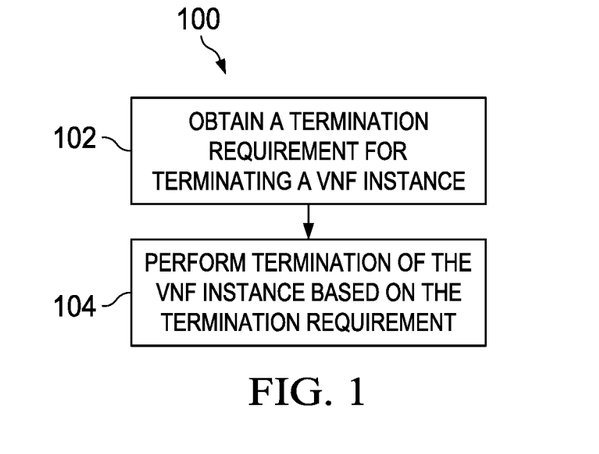
FIG. 1 illustrates a flow chart of an embodiment method for virtual network function (VNF) termination management.

FIG. 1 illustrates a flow chart of an embodiment method 100 for VNF management, where a VNF instance is terminated in accordance with one or more termination requirements of the VNF instance. The embodiment method 100 may be performed by any NFV management entity, such as a VNFM, a NFVO, or an EM, for example.

As shown in FIG. 1, at step 102, the method 100 obtains a termination requirement for terminating a VNF instance. The termination requirement may be defined and included in a VNF descriptor (VNFD) corresponding to the VNF instance. A VNFD describes a VNF in terms of its deployment and operational behavior, and is used by a VNFM to instantiate a VNF instance and for other lifecycle management of the VNF instance. The VNFD may be used to indicate termination requirements of a VNF instance.

In some embodiments, the VNFD corresponding to the VNF instance may indicate one or more termination mechanisms that the VNF instance may support. For example, the VNFD may indicate one or more termination types for the VNF instance, such as a graceful termination type, a forceful termination type, or both. Each of the termination types represents a termination mechanism. Other types of termination may also be defined by vendors or in future standards, and applied in the embodiment method.

In some embodiments, the VNFD corresponding to the VNF instance may include one or more timing parameters for termination of the VNF instance according to the graceful termination mechanism. For example, the timing parameters may include a timeout parameter which indicates a period of time that is allowed for terminating the VNF instance according to the graceful termination mechanism. This timeout period may be referred to as a graceful termination timeout period. The timing parameters may also include a starting time indicating when a timer should be started, according to a timeout parameter, to show the time elapsed for terminating the VNF instance gracefully. The timing parameters may further include a minimum timeout parameter indicating a minimum period of time that may be used for gracefully terminating the VNF instance, and/or a maximum timeout parameter indicating a maximum period of time that may be used for gracefully terminating the VNF instance.

In some embodiments, the VNFD corresponding to the VNF instance may include one or more actions to be taken after a graceful termination timeout period has elapsed. For example, if the VNF instance has not been terminated successfully according to the graceful termination mechanism after a graceful termination timeout period elapses, an action may be taken to forcefully terminate the VNF instance. As another example, if the VNF instance has been terminated according to the graceful termination mechanism when the graceful termination timeout period elapses, an action may be taken to release virtual resources allocated for the VNF instance. In yet another example, a NFV management entity may also take a corresponding action of the VNF instance that is not in conflict with termination descriptions defined in the VNFD corresponding to the VNF instance, when no termination result indication is received. Examples of other actions that may be taken may also include reporting a termination result of the VNF instance, and disconnecting entities that are associated with the VNF instance, etc.

In some embodiments, the VNFD corresponding to the VNF instance may also include other requirements, such as VNF termination conditions or policies, for termination of the VNF instance. For example, a VNF instance may require, based on different termination reasons for terminating the VNF instance, different sequence orders, e.g., in parallel or sequentially, for shutting down VMs, VNF components (VNFCs), or virtualization deployment units (VDUs) that are contained in the VNF instance. Examples of termination reasons may include power outage, traffic overload, traffic balancing, network maintenance, network component malfunction, an emergency, network failure, etc. As another example, the VNF instance may require different termination timing parameters corresponding to the different termination reasons, because different termination reasons may require different sequence orders to shut down component contained in the VNF instance and thus result in different timing requirements for performing termination operations. Thus, the VNFD may include sequence information for terminating virtual components, such as VMs, that are associated with or contained in the VNF instance, and/or timeout periods corresponding to different termination reasons.

In some embodiments, the VNFD may include scripts corresponding to the VNF instance. The scripts may be executed by a NFV management entity for performing termination operations to terminate the VNF instance. For example, the scripts may describe a termination procedure or a termination operation for terminating the VNF instance. The scripts may be vendor specific or in a standardized format. In some other embodiments, the VNFD may include a VNF recovery mechanism for the VNF instance. The VNF recovery mechanism may be used to recover the VNF instance later if the VNF instance has to been terminated immediately, e.g., without using the graceful termination mechanism.

Those of ordinary skill in the art would recognize that the VNFD may also include other requirements that may be applicable for terminating a VNF instance, and any one or any combination of the termination requirements described herein may be defined and included in the VNFD. Termination requirements included in a VNFD corresponding to a VNF instance may be obtained before or when the VNF instance is to be terminated, and may be obtained from a request to terminate the VNF instance.

Referring still to FIG. 1, at step 104, the method 100 performs termination of the VNF instance based on the termination requirement obtained. A NFV management entity, such as a NFVO and/or a VNFM, may execute the VNF termination based on the termination requirement. Execution of the termination may be initiated when a NFV management entity determines that a VNF instance needs to be terminated, or when a termination request is received by a NFV management entity for terminating a VNF instance. The NFV management entity may then send a request to the VNF instance for termination of the VNF instance. In some embodiments, policies and/or requirements for a network service (NS) containing the VNF instance may also be considered when terminating the VNF instance. For example, network services may require using different termination types to terminate a VNF instance based on the types of the network services. In some embodiments, the VNF instance may receive a termination reason code while receiving a termination request. A termination reason code indicates a corresponding termination reason. For example, when a VNF instance has to be terminated without using the graceful termination mechanism, e.g., due to a system failure or an emergency event, a termination reason code will be provided to the VNF instance. The VNF may record the reason and take corresponding actions based on the termination reason, such as immediately terminating the VNF instance, or terminating the VNF instance within a time period. After the VNF instance is terminated, the VNF instance may be shut down and resources that are assigned to the VNF instance may be released. A message may also be sent to indicate whether the VNF instance is terminated successfully.

Figure 2:
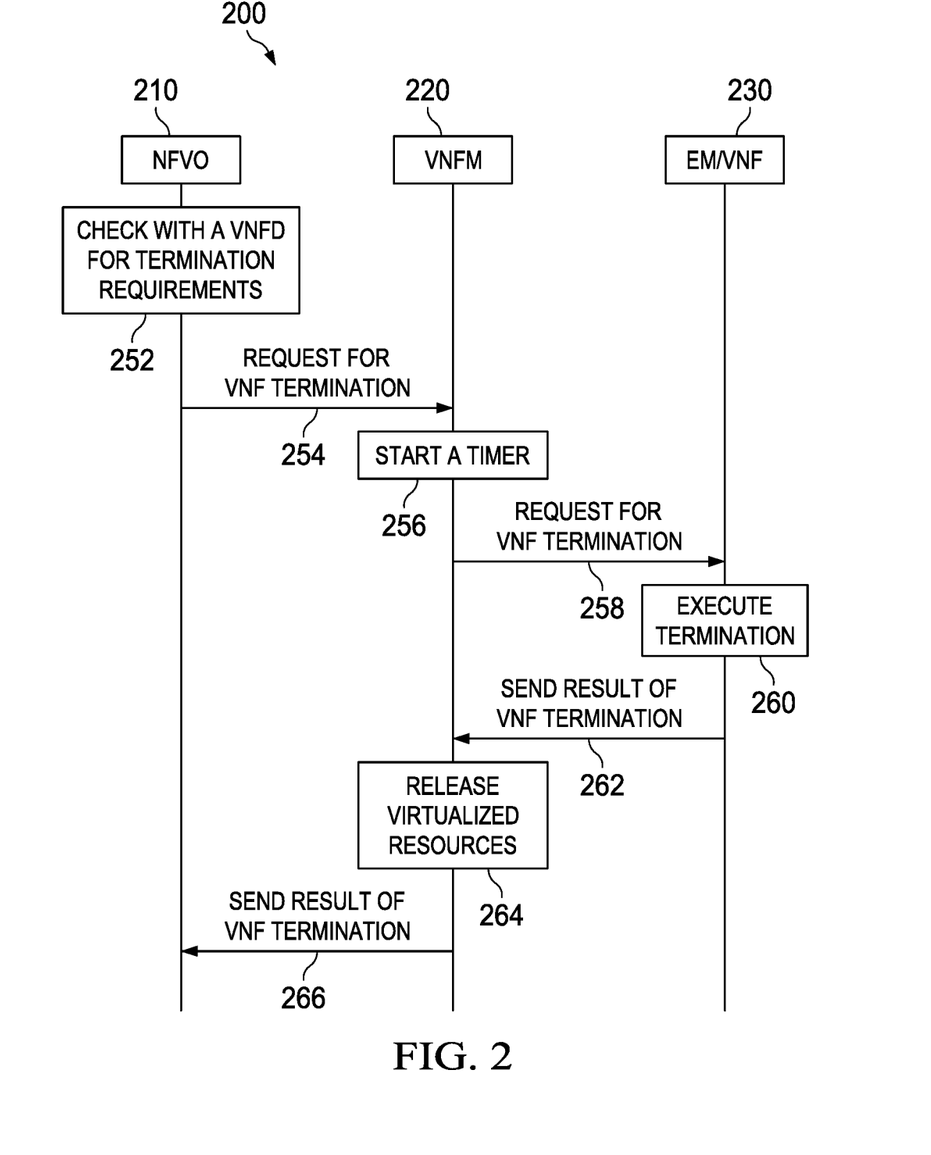
FIG. 2 illustrates a sequence diagram of an embodiment method for terminating a VNF instance.

FIG. 2 illustrates a sequence diagram of an embodiment method 200 for terminating a VNF instance. As shown, the method 200 includes a NFVO 210, a VNFM 220 and an EM/VNF 230 that are participating in operations of terminating the VNF instance.

When the VNF instance is to be terminated, at step 252, the NFVO 210 checks a VNFD corresponding to the VNF instance to determine one or more termination requirements for terminating the VNF instance. The termination requirements may be those described above with respect to FIG. 1. In one embodiment, the NFVO 210 may check the VNFD to determine what type of termination is supported by the VNF instance. For example, in a case where the graceful termination type and the forceful termination type are considered, the NFVO 210 may determine whether the VNF supports the graceful termination, the forceful termination, or both. When the VNF instance supports both the graceful termination and the forceful termination, the NFVO 210 may choose one based on other considerations or requirements, such as a reason for terminating a the VNF instance, or policies and/or requirements of a network service that contains the VNF instance. In this example, the NFVO 210 determines that the VNF instance is to be terminated according to the graceful termination mechanism. However, the graceful termination mechanism used herein is merely for illustration purposes, and should not be construed to limiting the scope of the claimed invention. Other termination types may also be applicable. In addition to the termination type, the NFVO 210 may also check the VNFD to determine other requirements for terminating the VNF instance, such as a timing parameter, or a recovery mechanism.

At step 254, the NFVO 210 sends a request to the VNFM 220 requesting termination of the VNF instance. In one embodiment, the request may include information that may be used in termination operations to terminate the VNF instance. For example, the request may include an identifier (ID) of the VNF instance, a termination type, and/or one or more timing parameters corresponding to the termination type, other requirements included in the VNFD, or any other information that may be derived from the VNFD, or based on information in the VNFD and adjusted by a NFV management entity.

When receiving the request for VNF termination from the NFVO 210, the VNFM 220 may determine information that will be used to terminate the VNF instance, and perform termination of the VNF instance according to the information. The information may include one or more termination requirements described above, and/or any other information that may be used in terminating the VNF instance. The VNFM 220 may obtain the information by accessing the VNFD corresponding to the VNF instance. Alternatively, the VNFM 220 may obtain this information from the received request which includes information for terminating the VNF instance, as described at step 254. When the VNFM 220 determines that the VNF instance is to be terminated according to the graceful mechanism, at step 256, the VNFM 220 starts a timer based on the timing parameter, e.g., a graceful termination timeout period, or a maximum/minimum timeout period for gracefully terminating the VNF instance, and at step 258, the VNFM 220 sends a request to the EM/VNF 230, requesting the EM/VNF 230 to gracefully terminate the VNF instance.

At step 260, the EM/VNF 230 executes termination of the VNF instance by executing an internal procedure to take the VNF instance out of service. At step 262, the EM/VNF 230 sends an indication, e.g., a termination result, to the VNFM 220 indicating whether the VNF instance has been terminated successfully. At step 264, upon receipt of the termination result, the VNFM 220 stops the timer and releases virtualized resources of the VNF instance. At step 266, the VNFM 220 sends to the NFVO 210 an indication, e.g., a result of the VNF termination operation, indicating whether the VNF instance has been terminated successfully.

In some embodiments, the method 200 may operate differently at step 264 and step 266. For example, at step 264, upon receipt of the termination result from the EM/VNF 230, the VNFM 220 may stop the timer and send to the NFVO 210 an indication indicating whether the VNF instance has been terminated successfully. Then at step 266, the NFVO 210 may release the virtualized resources of the VNF instance upon receipt of the indication from the VNFM 220. Other embodiments may also be applicable so that the NFVO 210 and the VNFM 220 cooperate to release virtual resources of the VNF instance upon receiving of a termination result for terminating the VNF instance.

When the timer expires and the VNFM 220 has not received any termination result from the EM/VNF 230, the requested termination may be determined to be unsuccessfully or unsatisfactorily executed. In this case, the VNFM 220 may send a notification to the NFVO 210 indicating the timeout for the termination of the VNF instance, and execute one or more corresponding actions defined in the VNFD. For example, the VNFM 220 may request the EM/VNF 230 to forcefully or immediately terminate the VNF instance. Information about the actions may be sent to the VNFM 220 by the NFVO 210 after the NFVO 210 receives the notification. In some embodiments, upon expiration of the timer, the VNFM 220 may take control of the termination process to terminate the VNF instance, or alternatively, the VNFM 220 may modify the termination process in various ways to terminate the VNF instance.

Figure 3:
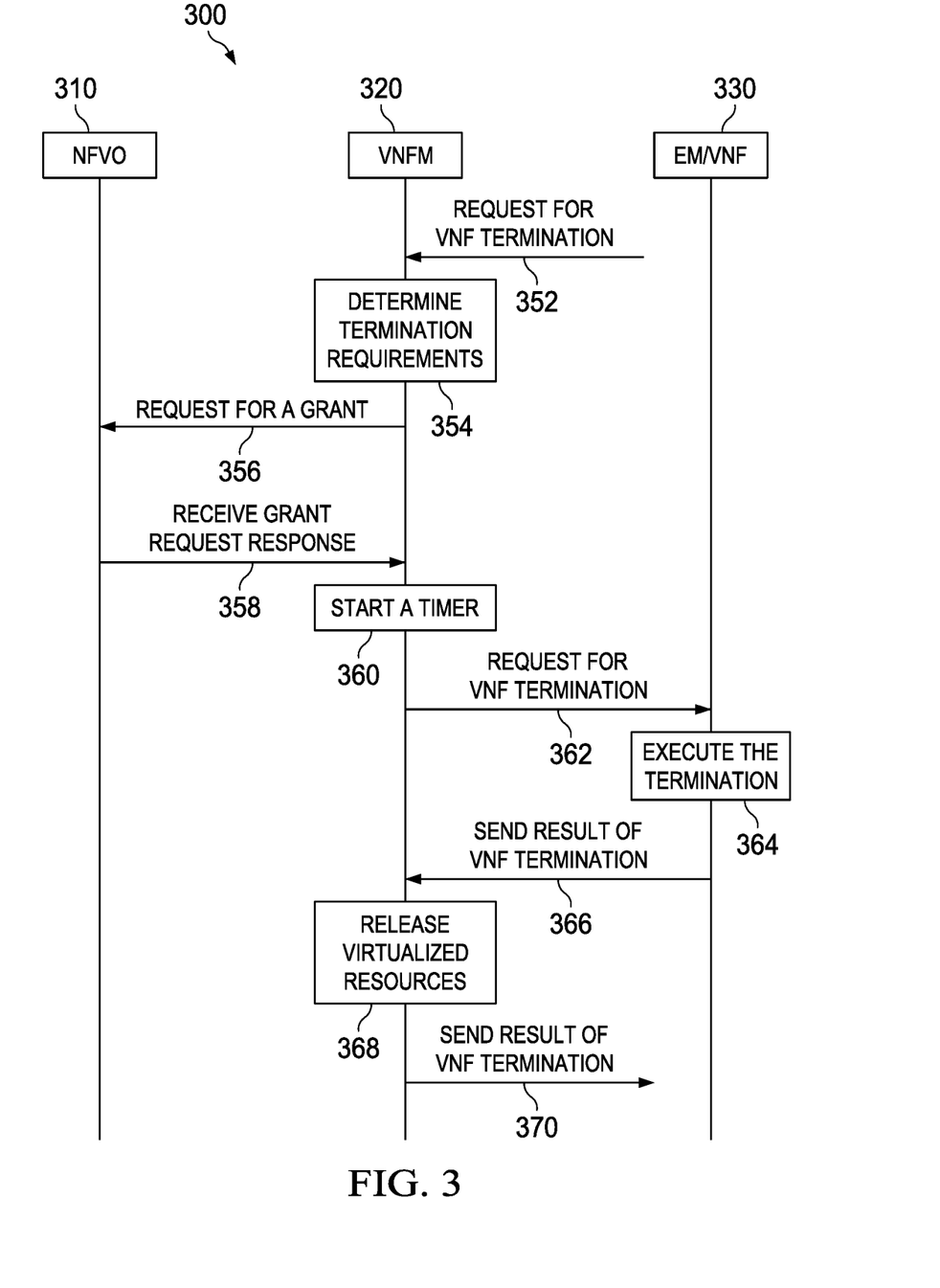
FIG. 3 illustrates a sequence diagram of another embodiment method for terminating a VNF instance.

FIG. 3 illustrates a sequence diagram of another embodiment method 300 for terminating a VNF instance. Similar to embodiment method 200, the method 300 also includes a NFVO 310, a VNFM 320 and an EM/VNF 330 participating in operations of terminating the VNF instance.

As shown, at step 352, the VNFM 320 receives a request to terminate the VNF instance, e.g., from a sender who requests to terminate the VNF instance. The request may be sent by a user or an operator of a NFV management system. In one embodiment, the request may include termination requirements of the VNF instance, such as an ID of the VNF instance, a termination type expected, e.g., a graceful termination type, a timing parameter, and/or other information needed for the termination operation, which is similar to those described above with respect to FIG. 2.

At step 354, upon receipt of the request, the VNFM 320 determines termination requirements of the VNF instance by accessing a VNFD corresponding to the VNF instance obtaining, or by checking the request for information included in the request. In some embodiments, the VNFM 320 may first determine the termination type, and then determine whether additional information is needed corresponding to the termination type. For example, when a graceful termination type is indicated either in the VNFD or in the request, the VNFM 320 may obtain further information about executing the graceful termination, such as a graceful termination timeout period or other timing parameters.

At step 356, the VNFM 320 sends a request, e.g., such as a GrantVnfLifecycleOperation Request, to the NFVO 310 requesting a grant for a lifecycle operation, i.e. termination, of the VNF instance. At step 358, the VNFM 320 receives a response, e.g., a GrantVnfLifecycleOperation Response, from the NFVO 310 in response to the grant request.

When a grant is assigned to the VNFM 320 in the response, the method 300 will perform steps 360-368 similarly to steps 256-264 in FIG. 2. Basically, the VNFM 320 starts, at step 360, a timer based on a timing parameter, and requests, at step 362, the EM/VNF 330 to gracefully terminate the VNF instance. The timing parameter may be obtained either from the sender of step 352 or from the VNFD of the VNF instance. At step 364, the EM/VNF 330 executes an internal procedure to take the VNF instance out of service, and at step 366, the EM/VNF 330 sends a termination result to the VNFM 320 indicating whether the VNF instance is terminated successfully. The VNFM 320 then stops the timer when it receives a termination result indicating that VNF instance is terminated from the EM/VNF 330, and release, at step 368, virtualized resources of the VNF instance.

At step 370, the VNFM 320 sends to the sender in step 352 an indication, e.g., a result of the VNF termination operation, indicating whether the VNF instance has been terminated successfully. Similar to the embodiment method 200 in FIG. 2, when the timer expires and the VNFM 320 has not received any termination result from the EM/VNF 330, the requested termination may be determined to be unsuccessfully or unsatisfactorily executed, and the VNFM 320 sends a timeout notification to the sender and execute one or more corresponding actions defined in the VNFD.

Figure 4:
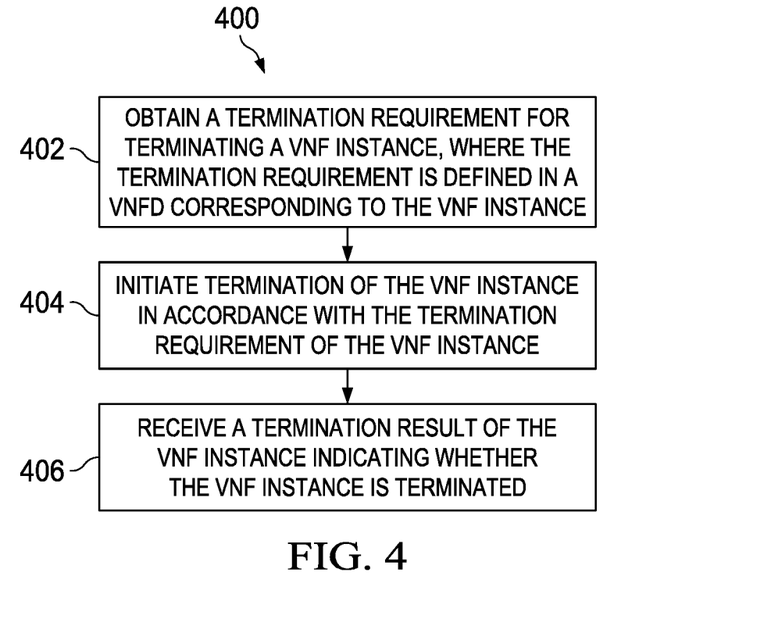
FIG. 4 illustrates a flow chart of another embodiment method for VNF termination management.

FIG. 4 illustrates a flow chart of another embodiment method 400 of VNF management. The method 400 may be performed by any NFV management entity, such as a VNFM, a NFVO, or an EM. At step 402, the method 400 obtains a termination requirement for terminating a VNF instance. The termination requirement of the VNF instance may be one or more termination requirements defined in a VNFD corresponding to the VNF instance, as described above with respect to FIG. 1. At step 404, the method 400 initiates termination of the VNF instance in accordance with the termination requirement of the VNF instance. At step 406, the method 400 receives a termination result of the VNF instance indicating whether the VNF instance is terminated. The method 400 may further include releasing virtual resources of the VNF instance after the VNF instance has been terminated.

In some embodiments, the termination requirement includes a termination type in accordance with which the VNF instance is terminated. For example, the termination requirement may include a graceful termination type, and/or a forceful termination type. In one embodiment, the termination requirement includes a recovery mechanism for recovering the VNF instance after the VNF instance has been terminated. In another embodiment, the termination requirement includes a timing parameter for terminating the VNF instance. The timing parameter may include a timeout parameter that indicates a time interval to wait for the VNF instance to be terminated according to a graceful termination mechanism. Alternatively, the timing parameter may include a minimum timeout parameter or a maximum timeout parameter that indicates a time interval to wait for the VNF instance to be terminated according to a graceful termination mechanism. In yet another embodiment, the termination requirement may include information for terminating, in parallel or sequentially, virtual machines (VMs) associated with the VNF instance.

In some embodiments, the method 400 may initiate the termination of the VNF instance by sending a request to terminate the VNF instance. The request may include an identifier of the VNF instance. Alternatively, the request may include a termination type that is requested for terminating the VNF instance. The request may also include a time duration for terminating the VNF instance in accordance with a graceful termination mechanism. The request may further indicate a reason for terminating the VNF instance.

In some embodiments, the method 400 may initiate the termination of the VNF instance by starting a timer in accordance with the termination requirement of the VNF instance, and the timer indicates a time interval for terminating the VNF instance gracefully. In one embodiment, upon expiration of the timer and incomplete termination of the VNF instance in accordance with a graceful termination mechanism, the VNF instance is terminated using a forceful termination mechanism.

Figure 5:
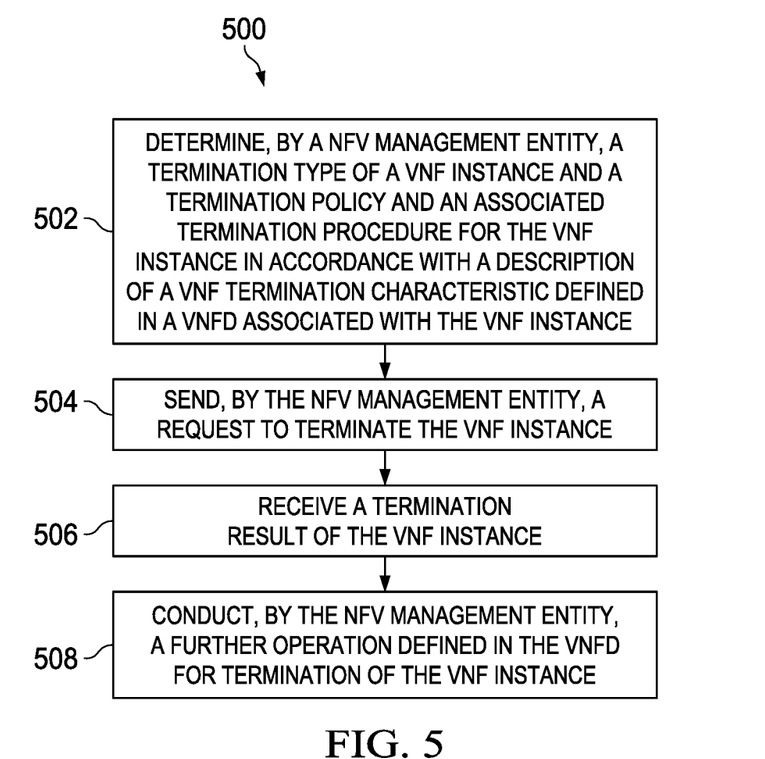
FIG. 5 illustrates a flow chart of yet another embodiment method for VNF termination management.

FIG. 5 illustrates a flow chart of yet another embodiment method 500 for VNF termination management. At step 502, the method 500 may determine, by a NFV management entity, a termination type of a VNF instance and a termination policy and an associated termination procedure for the VNF instance in accordance with a description of a VNF termination characteristic defined in a VNFD associated with the VNF instance. An example of the termination policy may include timer conditions for a graceful termination of the VNF instance, and the timer conditions may include minimum and maximum time for termination. An example of the associated termination procedure for the VNF instance may include a procedure or operation(s) described in scripts defined in the VNFD for the associated termination procedure.

The method 500 may also send, by the NFV management entity at step 504, a request to terminate the VNF instance, and then receive at step 506 a termination result of the VNF instance. At step 508, the method 500 may further conduct, by the NFV management entity, a further operation defined in the VNFD for termination of the VNF instance. For example, the NFV management entity may release virtual resources of the VNF instance. The further operation defined in the VNFD for termination of the VNF instance may also be performed when the termination result indicates an incomplete or unsatisfactory termination. The NFV management entity may be a VNFM or an NFVO. The NFV management entity may take an action that does not conflict with the description of the VNF termination characteristic defined in the VNFD, when not receiving any indication indicating the termination result.

Figure 6:
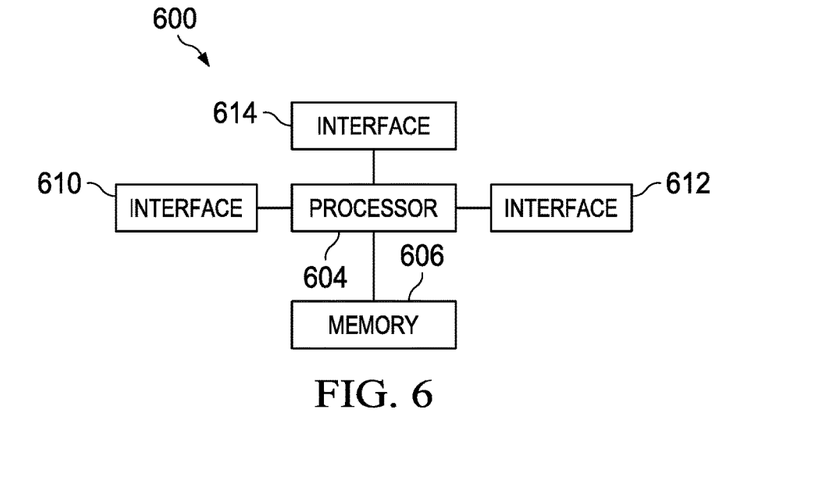
FIG. 6 illustrates a block diagram of an embodiment processing system.

FIG. 6 illustrates a block diagram of an embodiment processing system 600 for performing methods described herein, which may be installed in a host device. The processing system 600 may be configured to operate as a NFV management entity, such as a VNFM, a NFVO or an EM. As shown, the processing system 600 includes a processor 604, a memory 606, and interfaces 612-614, which may (or may not) be arranged as shown in the figure. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 612, 612, 614 may be any component or collection of components that allow the processing system 600 to communicate with other devices/components and/or a user. For example, one or more of the interfaces 612, 612, 614 may be adapted to communicate data, control, or management messages from the processor 604 to applications installed on the host device and/or a remote device. As another example, one or more of the interfaces 612, 612, 614 may be adapted to allow a user or user device (e.g., personal computer (PC), etc.) to interact/communicate with the processing system 600. The processing system 600 may include additional components not depicted in the figure, such as long term storage (e.g., non-volatile memory, etc.).

In some embodiments, the processing system 600 is included in a network device that is accessing, or otherwise part of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 612, 612, 614 connects the processing system 600 to a transceiver adapted to transmit and receive signaling over the telecommunications network.

Figure 7:
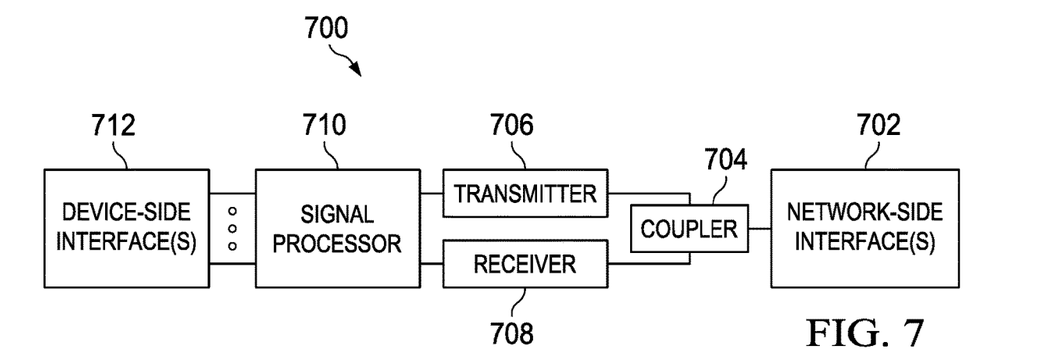
FIG. 7 illustrates a block diagram of a transceiver adapted to transmit and receive signaling over a telecommunications network.

FIG. 7 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an obtaining unit/module, an initiating unit/module, a sending unit/module, a determining unit/module, a conducting unit/module, and/or a releasing unit/module. The respective units/modules may be hardware, software, or a combination thereof. For instance, one or more of the units/modules may be an integrated circuit, such as field programmable gate arrays (FPGAs) or application-specific integrated circuits (ASICs).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for virtual network function (VNF) management, comprising:
    obtaining, by a network function virtualization (NFV) management entity, a message specifying a termination request, the termination request terminating a VNF instance corresponding to a VNF descriptor (VNFD);
    selecting, by the NFV management entity, a graceful termination procedure for the VNF instance in accordance with the termination request and based thereon executing a script to perform the graceful termination procedure after starting a timer corresponding to a timeout parameter defined by the VNFD; and
    receiving, by the NFV management entity, a termination result of the VNF instance, the termination result indicating whether the VNF instance has been terminated.

2. The method of claim 1, wherein the VNFD further defines a recovery mechanism for recovering the VNF instance after the VNF instance has been terminated.

3. The method of claim 1, wherein the VNFD further defines a timing parameter that specifies a grace period.

4. The method of claim 1, wherein the timing parameter specifies a minimum timeout for initiating or executing the graceful termination procedure for the VNF instance.

5. The method of claim 1, wherein the VNFD defines a requirement for terminating virtual machines (VMs) associated with the VNF instance.

6. The method of claim 5, wherein the requirement for terminating the VMs associated with the VNF instance requires the VMs associated with the VNF instance to be terminated in parallel with one another.

7. The method of claim 5, wherein the requirement for terminating the VMs associated with the VNF instance requires the VMs associated with the VNF instance to be terminated sequentially.

8. The method of claim 1, wherein initiating the graceful termination procedure of the VNF instance comprises sending a request to terminate the VNF instance.

9. The method of claim 8, wherein the request comprises an identifier of the VNF instance.

10. The method of claim 8, wherein the request indicates a recovery mechanism defined by the VNFD.

11. The method of claim 8, wherein the request indicates a time interval for terminating the VNF instance in accordance with a graceful termination mechanism.

12. The method of claim 8, wherein the request indicates a reason for terminating the VNF instance.

13. The method of claim 1, wherein initiating or executing the graceful termination procedure for the VNF instance comprises starting the timer in accordance with a graceful termination requirement defined by the VNFD, the timer set according to a grace period associated with the graceful termination requirement.

14. The method of claim 13, further comprising terminating the VNF instance using a forceful termination mechanism upon determining that execution of the graceful termination procedure has not been completed prior to expiration of the timer.

15. The method of claim 1, further comprising releasing virtual resources of the VNF instance after the VNF instance has been terminated.

16. The method of claim 1, wherein the NFV management entity is an element manager (EM), a VNF manager (VNFM), or an NFV orchestrator (NFVO).

17. The method of claim 1, wherein a value of timeout parameter is defined by the VNFD.

18. A processing system adapted for virtual network function (VNF) management, comprising:
    a memory storage comprising instructions; and
    one or more processors in communication with the memory storage, wherein the one or more processors are configured to execute the instructions to:
        obtain, by a network function virtualization (NFV) management entity, a message specifying a termination request, the termination request terminating a VNF instance corresponding to a VNF descriptor (VNFD);
        select, by the NFV management entity, a graceful termination procedure for the VNF instance in accordance with the termination request and based thereon executing a script to perform the graceful termination procedure after starting a timer corresponding to a timeout parameter defined by the VNFD; and receive, by the NFV management entity, a termination result of the VNF instance, the termination result indicating whether the VNF instance has been terminated.

19. The processing system of claim 18, wherein the VNFD further defines a recovery mechanism for recovering the VNF instance after the VNF instance has been terminated.

20. The processing system of claim 18, wherein the VNFD further defines a timing parameter that specifies a grace period.

21. The processing system of claim 18, wherein the timing parameter specifies a minimum timeout for initiating or executing the graceful termination procedure for the VNF instance.

22. The processing system of claim 18, wherein the VNFD defines a requirement for terminating virtual machines (VMs) associated with the VNF instance.

23. The processing system of claim 18, wherein a value of the timeout parameter is defined by the VNFD.

24. The method of claim 1, the executing the script to perform the graceful termination procedure comprising:
  sending, to an element manager (EM), a request requesting the EM to gracefully terminate the VNF instance, wherein the timer is started before the request is sent to the EM.

25. The processing system of claim 18, with the processing system further executing the instructions to send, to an element manager (EM), a request requesting the EM to gracefully terminate the VNF instance, wherein the timer is started before the request is sent to the EM.

* * * * *